(12) United States Patent
Clarke

(10) Patent No.: US 11,526,184 B2
(45) Date of Patent: Dec. 13, 2022

(54) VEHICLE SEAT INCLUDING A HEATING MAT HAVING OVERHEATING PREVENTION AND PROTECTION

(71) Applicant: Lear Corporation, Southfield, MI (US)

(72) Inventor: Alex K. Clarke, Atherstone (GB)

(73) Assignee: Lear Corporation, Southfield, MI (US)

( * ) Notice: Subject to any disclaimer, the term of this patent is extended or adjusted under 35 U.S.C. 154(b) by 581 days.

(21) Appl. No.: 16/380,228

(22) Filed: Apr. 10, 2019

(65) Prior Publication Data

US 2019/0310668 A1 Oct. 10, 2019

Related U.S. Application Data

(60) Provisional application No. 62/655,294, filed on Apr. 10, 2018.

(51) Int. Cl.
| | | |
|---|---|---|
| G05D 23/19 | (2006.01) | |
| B60R 16/037 | (2006.01) | |
| G05B 9/02 | (2006.01) | |
| B60N 2/56 | (2006.01) | |
| H05B 6/06 | (2006.01) | |
| G03G 15/20 | (2006.01) | |
| H05B 3/34 | (2006.01) | |
| H05B 3/58 | (2006.01) | |
| H05B 3/00 | (2006.01) | |

(52) U.S. Cl.
CPC ....... *G05D 23/1927* (2013.01); *B60N 2/5607* (2013.01); *B60N 2/5678* (2013.01); *B60R 16/037* (2013.01); *G03G 15/2039* (2013.01); *G05B 9/02* (2013.01); *H05B 3/0019* (2013.01); *H05B 3/342* (2013.01); *H05B 3/58* (2013.01); *H05B 6/06* (2013.01); *H05B 2203/029* (2013.01)

(58) Field of Classification Search
CPC .... G05D 23/1927; H05B 3/0019; H05B 3/58; H05B 3/342; H05B 6/06; H05B 2203/029; G03G 15/2039; B60R 16/037; G05B 9/02; B60N 2/5607; B60N 2/5678; B60N 2/5642; A47C 7/746
See application file for complete search history.

(56) References Cited

U.S. PATENT DOCUMENTS 5,801,914 A 9/1998 Thrash
6,403,935 B2 6/2002 Kochman et al.
(Continued)

FOREIGN PATENT DOCUMENTS

WO WO-02069671 A2 * 9/2002 ............... H01R 4/14

*Primary Examiner* — Shawntinat Fuqua
(74) *Attorney, Agent, or Firm* — MacMillan, Sobanski & Todd, LLC

(57) ABSTRACT

A vehicle seat includes a seat portion having a heating element, such as an electrically conductive wire. A sensing structure having a characteristic that is responsive to a temperature of the heating element is provided adjacent to the heating element, such as by being helically wrapped thereabout or extending parallel thereto. For example, the sensing structure may include an optical fiber, and the characteristic of the sensing structure may be an amount of light transmitted through the optical fiber. A controller is responsive to the characteristic of the sensing structure for determining when the temperature of the heating element exceeds a predetermined value.

10 Claims, 3 Drawing Sheets

(56) References Cited

U.S. PATENT DOCUMENTS

| | | | |
|---|---|---|---|
| 6,563,094 B2 | 5/2003 | Kochman et al. | |
| 6,713,733 B2 | 3/2004 | Kochman et al. | |
| 6,933,469 B2 * | 8/2005 | Ellis | A61F 7/00 |
| | | | 219/217 |
| 7,495,207 B2 * | 2/2009 | Ogura | G01J 5/602 |
| | | | 359/334 |
| 8,066,324 B2 | 11/2011 | Nathan et al. | |
| 2002/0117495 A1 * | 8/2002 | Kochman | F24D 13/024 |
| | | | 219/549 |

* cited by examiner

VEHICLE SEAT INCLUDING A HEATING MAT HAVING OVERHEATING PREVENTION AND PROTECTION

CROSS-REFERENCE TO RELATED APPLICATIONS

This application claims the benefit of U.S. Provisional Application No. 62/655,294, filed Apr. 10, 2018, the disclosure of which is incorporated herein by reference.

BACKGROUND OF THE INVENTION

This invention relates in general to heated seats for vehicles. In particular, this invention relates to an improved heated vehicle seat that includes a heating mat having a structure that prevents overheating from occurring and/or protects the vehicle seat if overheating occurs.

Vehicles, such as passenger cars, usually include one or more seats for supporting an occupant thereon during use. A typical vehicle seat includes a seat portion and a back portion, each of which includes a structural frame having occupant supporting and cushioning features provided thereon. The structural frame is typically formed from a relatively rigid material, such as steel or aluminum. The occupant supporting and cushioning features typically include one or more springs supported on the structural frame, a foam bun supported on the springs, and an external trim or upholstery layer supported on the foam bun. These features function to make the seat comfortable for the occupant and provide an aesthetically pleasing appearance.

In some vehicle seats, a heating system is provided that selectively generates heat for the comfort of an occupant sitting thereon. A typical heating system for a vehicle seat includes a source of electrical energy that is selectively connected to a heating mat provided within the vehicle seat. Usually, the heating mat is generally flat and rectangular in shape and contains an electrically conductive wire that extends throughout, typically in a serpentine manner. When the source of electrical energy is energized, electrical current flows through the electrically conductive wire contained in the heating mat. Because of its inherent resistance to the flow of electrical current therethrough, the electrically conductive wire generates heat, which is radiated through the heating mat and the vehicle seat to the occupant.

Ideally, the resistance to the flow of the electrical current through the electrically conductive wire is generally uniform throughout the length thereof. This would result in the generation of a generally uniform distribution of heat throughout the length of the electrically conductive wire and, thus, the heating mat and the vehicle seat. In some instances, however, it has been found that the resistance to the flow of electrical current through the electrically conductive wire is not generally uniform throughout the length thereof. This can result in the generation of a non-uniform distribution of heat throughout the length of the electrically conductive wire, the heating mat, and the vehicle seat. Such non-uniform distribution of heat can result in undesirable localized areas of overheating, which can cause damage to some or all of the electrically conductive wire, the heating mat, and/or the vehicle seat. Thus, it would be desirable to provide an improved structure for a heated vehicle seat that includes a heating mat having a structure that prevents overheating from occurring and/or protects the vehicle seat if overheating occurs.

SUMMARY OF THE INVENTION

This invention relates to an improved structure for a heated vehicle seat that includes a heating mat having a structure that prevents overheating from occurring and/or protects the vehicle seat if overheating occurs. The vehicle seat includes a seat portion having a heating element, such as an electrically conductive wire. A sensing structure having a characteristic that is responsive to a temperature of the heating element is provided adjacent to the heating element, such as by being helically wrapped thereabout or extending parallel thereto. For example, the sensing structure may include an optical fiber, and the characteristic of the sensing structure may be an amount of light transmitted through the optical fiber. A controller is responsive to the characteristic of the sensing structure for determining when the temperature of the heating element exceeds a predetermined value.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
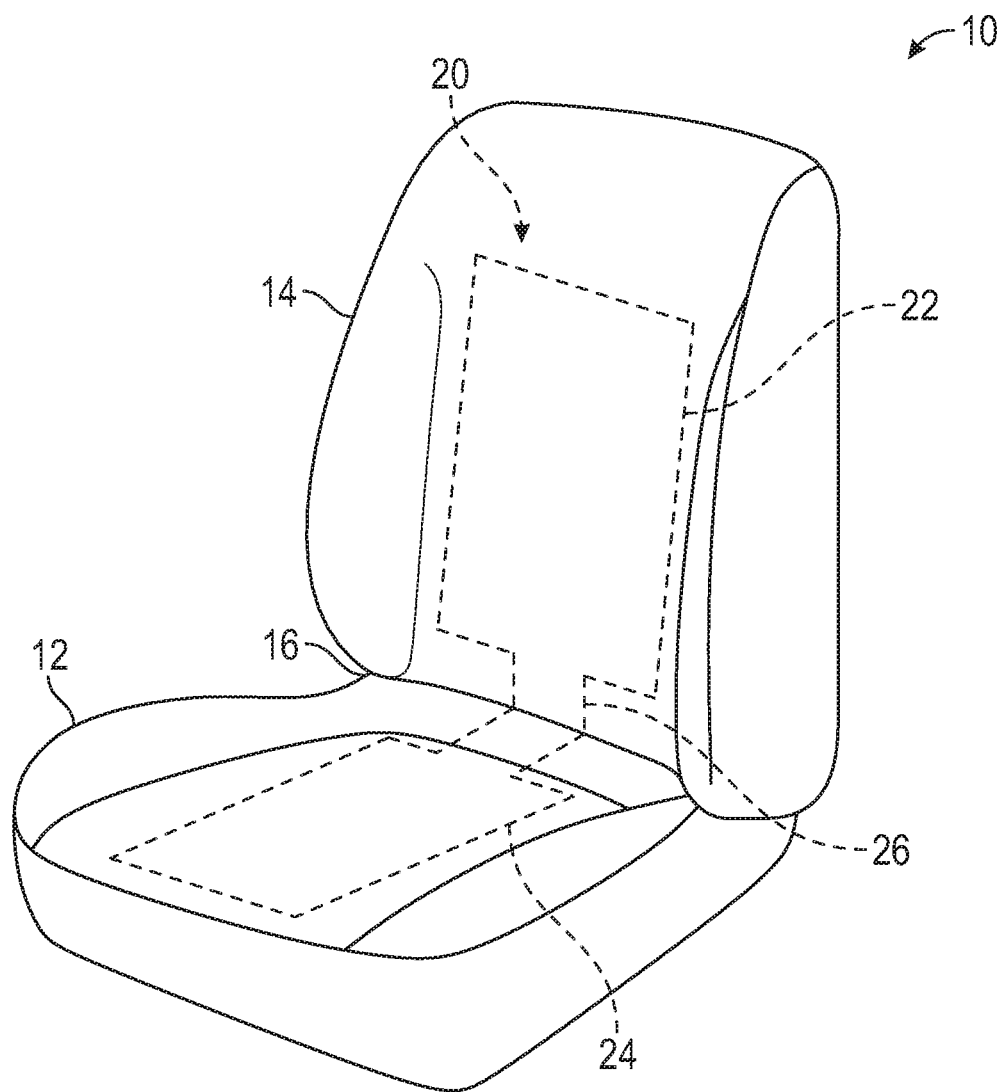
FIG. 1 is a perspective view of a vehicle seat including a heating mat having a structure that prevents overheating from occurring and/or protects the vehicle seat if overheating occurs in accordance with this invention.

Referring now to the drawings, there is illustrated in FIG. 1 a seat, indicated generally at 10, that is configured to support an occupant thereon. The illustrated seat 10 is configured for installation in a vehicle (not shown). However, it will be understood that the seat 10 may be installed and/or used in any other environment, including those not related to vehicles. The illustrated vehicle seat 10 is, in large measure, conventional in the art and is intended merely to illustrate one environment in which this invention may be used. Thus, the scope of this invention is not intended to be limited for use with the specific structure of the seat 10 illustrated in FIG. 1 or with vehicle seats in general. On the contrary, as will become apparent below, this invention may be used in any desired environment for the purposes described below.

The illustrated seat 10 includes a seat bottom portion 12 and a seat back portion 14. However, it should be understood that the seat 10 may be embodied as any other mechanisms, structures, or devices sufficient to support an occupant, including merely the seat bottom portion 12. The illustrated seat back portion 14 is pivotably supported on the seat bottom portion 12 by a conventional hinge portion 16, although such is not required.

The illustrated seat 10 further includes a heating mat, indicated generally at 20, that is configured to generate and distribute heat throughout the seat bottom portion 12 and the seat back portion 14 of the seat 10. In one embodiment, the heating mat 20 is made out of a substantially flexible material. However, the heating mat 20 may be made out of any desired material. The illustrated heating mat 20 includes a first portion 22 and a second portion 24 that are connected together by a third portion 26. However, it will be understood that the heating mat 20 may include any desired number of portions, including only one, that are connected together in any desired manner. The illustrated first, second, and third portions 22, 24, and 26 of the heating mat 20 are each generally rectangular in shape. However, it will be understood that the first, second, and third portions 22, 24, and 26 of the heating mat 20 may have any desired shape or combination of shapes. As illustrated, the first portion 22 of the heating mat 20 is located within the seat back portion 14 of the seat 10, while the second portion 24 of the heating mat 20 is located within the seat bottom portion 12 of the seat 10. The third portion 26 of the heating mat 20 extends through the hinge portion 16 of the seat 10 between the first portion 22 and the second portion 24. However, it will be understood that the first, second, and third portions 22, 24, and 26 of the heating mat 20 may be located at any desired location or combination of locations within the seat 10.

Figure 2:
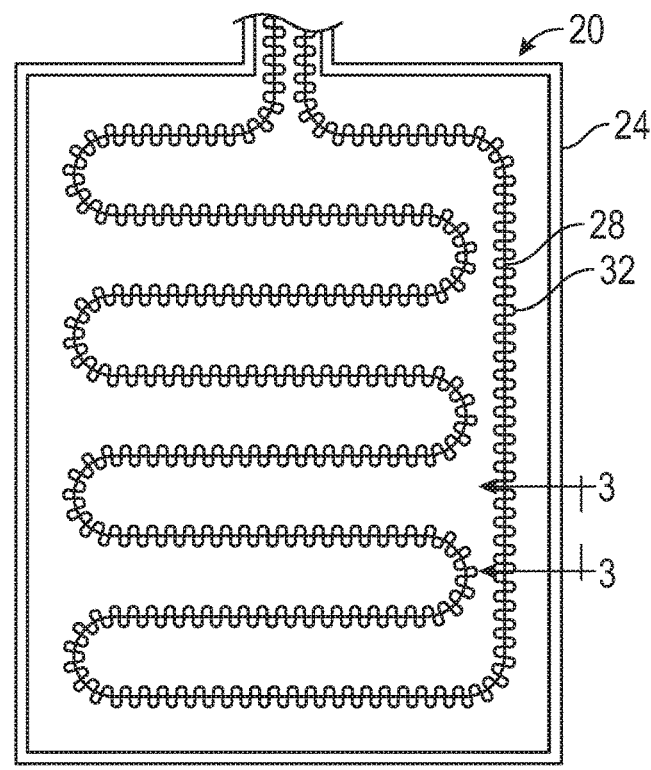
FIG. 2 is an enlarged top plan view of a portion of the heating mat illustrated in FIG. 1.
Figure 3:
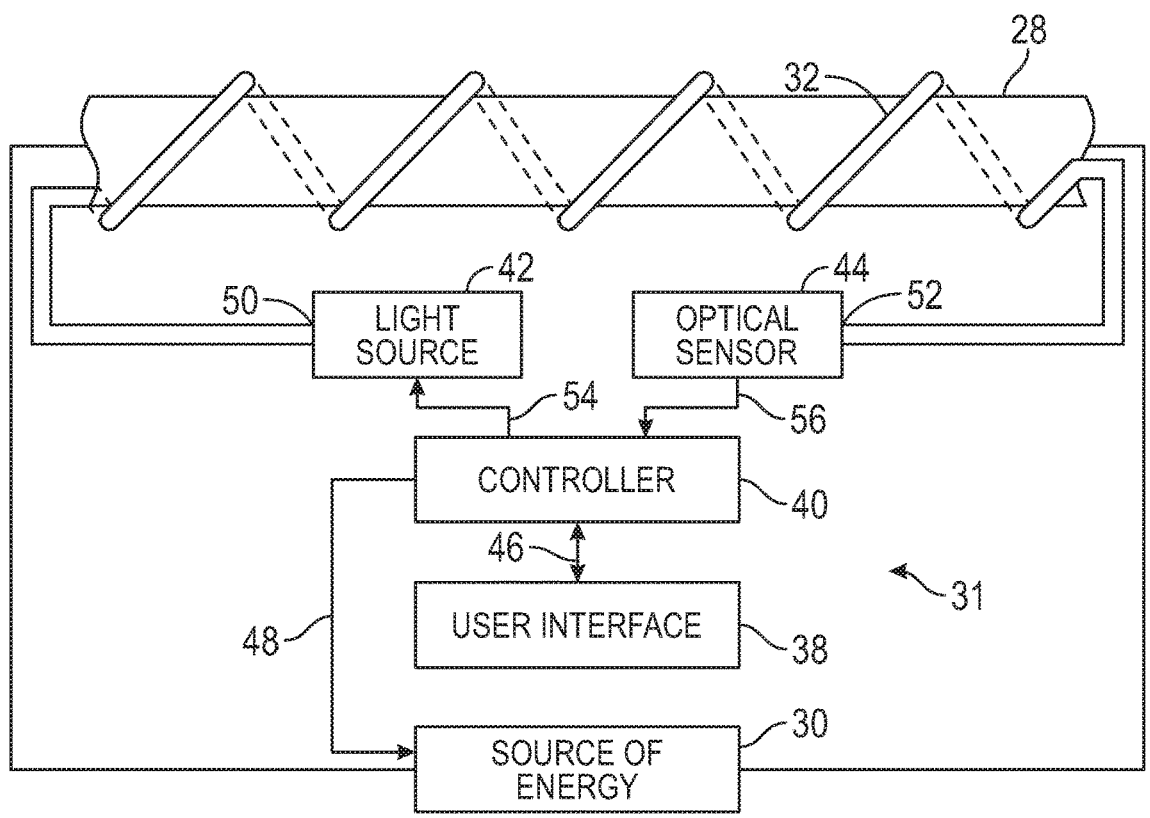
FIG. 3 is a further enlarged cross-sectional view taken along line 3-3 of FIG. 2 of a portion of a heating element contained within the heating mat, together with a block diagram of an apparatus for operating and monitoring the heating mat.

Referring now to FIG. 2, the second portion 24 of the heating mat 20 is illustrated in greater detail. As shown therein, the second portion 24 of the heating mat 20 includes a heating element 28 that, in the illustrated embodiment, extends throughout most of the second portion 24 of the heating mat 20 in a mostly serpentine manner. However, it will be understood that the heating element 28 may extend throughout any portion, or all, of the heating mat 20 in any desired manner. As shown in FIG. 3, the heating element 28 is connected to a source of energy 30. The source of energy 30 and the heating element 28 are configured to cooperate so as to generate and distribute heat throughout the heating mat 20.

In the illustrated embodiment, the heating element 28 is an electrically conductive structure, such as a wire, having an inherent electrical resistance, while the source of energy 30 is an electrical current generator. When energized, the source of energy 30 causes electrical current to flow through the heating element 28. Because of the inherent resistance of the heating element 28 to the flow of electrical current therethrough, the heating element 28 generates heat, and such heat is radiated through the heating mat 20 and the seat 10 to an occupant thereon. However, it will be understood that the heating element 28 and the source of energy 30 may be embodied as any other mechanisms, structures, or devices that are capable of transmitting energy through the heating element 28 in such a manner as to generate and distribute heat throughout the heating mat 20 and the seat 10.

FIG. 3 illustrates an apparatus, indicated generally at 31, that is configured to operate and monitor the heating mat 20. The apparatus 31 includes an optical fiber 32 that is supported on or within the heating mat 20, adjacent to the heating element 28. The optical fiber 32 may be embodied as any desired conduit or other structure formed from any desired material that is capable of transmitting light or other form of energy therethrough, such as a glass, plastic, or copolymer material, for example. Although this invention will be described and illustrated in the context of light being transmitted through the optical fiber 32, it will be appreciated that this invention may be practiced using any other form of signals or energy that can be transmitted through a conduit or other structure.

The illustrated optical fiber 32 is configured to monitor the temperature of the heating element 28. Specifically, the optical fiber 32 is configured to detect an area of excessive heat in the heating element 28. To accomplish this, the optical fiber 32 is disposed in substantially close proximity to the heating element 28 along the length thereof. As illustrated in FIG. 3, the optical fiber 32 may be wrapped helically around the heating element 28. However, it will be understood that the optical fiber 32 may be positioned in any configuration relative to the heating element 28 that is sufficient to permit the optical fiber 32 to monitor the temperature of the heating element 28. The operation of the optical fiber 32 in this regard will be discussed in more detail below.

The apparatus 31 also includes a user interface 38 and a controller 40. The user interface 38 is configured to permit an occupant of the seat 10 or other person to control the operation of the apparatus 31. The user interface 38 may be located anywhere that is accessible to the occupant of the seat 10, such as an instrument panel (not shown) within the vehicle, for example. The user interface 38 may be connected to the controller 40 by a signal line 46. However, it should be understood that the user interface 38 may be connected to the controller 40 by any other mechanism, structure, or device, including a wireless connection. The controller 40 is configured to receive input signals via the signal line 46 from the user interface 38 and communicate with other components of the apparatus 31. For example, the controller 40 is connected by a signal line 48 to the source of energy 30. The operation of the user interface 38 and the controller 40 will be discussed in greater detail below.

The apparatus 31 further includes a light source 42 and an optical sensor 44. The light source 42 is configured to generate light through the optical fiber 32. To accomplish this, the light source 42 may be connected to a first end 50 of the optical fiber 32 such that the light generated by the light source 42 travels into the first end 50 and through the optical fiber 32. The optical sensor 44 is configured to detect the light generated by the light source 42 to the optical fiber 32. To accomplish this, the optical sensor 44 may be connected to a second end 52 of the optical fiber 32 such that the optical sensor 44 can detect light that has traveled through the optical fiber 32 and out of the second end 52 thereof. The controller 40 is connected to the light source 42 by a signal line 54. However, it will be understood that the controller 40 can be connected to the light sensor 42 by any other mechanism, structure, or device, including a wireless connection. The optical sensor 44 is connected to the controller 40 by a signal line 56. However, it will be understood that the optical sensor 44 can be connected to the controller 40 by any other mechanism, structure, or device, including a wireless connection. The operation of the light source 42 and the optical sensor 44 will be described in more detail below.

In operation, the occupant of the seat 10 initially selects a desired heat generation setting for the seat 10 by means of the user interface 38. The user interface 38 then transmits a signal that is representative of the desired heat generation setting through the signal line 46 to the controller 40. In response thereto, the controller 40 causes the source of energy 30 to function in cooperation with the heating element 28 to generate heat in the manner described above and as requested by the occupant of the seat 10. At the same time, the controller 40 also sends a signal through the signal line 54 to the light source 42, which causes the light source 42 to transmit light into the first end 50 of the optical fiber 32. Such light is transmitted through the length of the optical fiber 32 and through the second end 52 thereof to the optical sensor 44.

Under normal operating conditions, the amount of heat generated by the heating element 28 is insufficient to cause any significant change in the ability of the optical fiber 32 to transmit light from the light source 42 to the optical sensor 44. Thus, as long as the optical sensor 44 receives the light generated from the light source 42 through the optical fiber 32, then it can be assumed that the amount of heat generated by the heating element 28 is not in excess of a predetermined maximum amount. In this instance, the optical sensor 44 communicates through the signal line 56 to the controller 40 that the light is being transmitted from the light source 42 through the optical fiber 32. In response thereto, the controller 40 determines the apparatus is operating properly and continues to operate the apparatus 31 in response to the signals from the user interface 38.

As discussed above, the resistance to the flow of the electrical current through the heating element 28 is generally uniform throughout the length thereof. This would result in the generation of a generally uniform distribution of heat throughout the length of the heating element 28 and, thus, the heating mat 20 and the associated portion of the seat 10. In some instances, however, it has been found that the resistance to the flow of electrical current through the heating element 28 is not generally uniform throughout the length thereof. This can result in the generation of a non-uniform distribution of heat throughout the length of the heating element 28 and, thus, the heating mat 20 and the associated portion of the seat 10. Such non-uniform distribution of heat can result in undesirable localized areas of overheating, which can cause damage to the heating element 28, the heating mat 20, and/or the associated portion of the seat 10.

If the amount of heat generated by any portion of the heating element 28 exceeds a predetermined maximum amount, then such heat will significantly change the ability of the adjacent portion of the optical fiber 32 to transmit light therethrough from the light source 42 to the optical sensor 44. For example, when the amount of heat generated by any portion of the heating element 28 exceeds the predetermined maximum amount, then such heat may melt the adjacent portion of the optical fiber 32, thus preventing the optical sensor 44 from receiving any of the light generated from the light source 42 through the optical fiber 32.

When this occurs, then it can be assumed that the amount of heat generated by the heating element 28 is in excess of the predetermined maximum amount. In this instance, the optical sensor 44 communicates through the signal line 56 to the controller 40 that no light (or a different amount or characteristic of light) is being detected at the second end 52 of the optical fiber 32. In response thereto, the controller 40 determines that the heating element 28 is not operating properly and discontinues to operate the apparatus 31 in response to the signals from the user interface 38. After identifying that a fault has occurred, the controller 40 may de-energize the source of energy 30 and, thus, cause the heating element 28 to cease generating heat. Additionally or alternatively, the controller 40 may generate an audible or visual alarm alerting the occupant of the seat 10 of the failure that has been detected.

Figure 4:
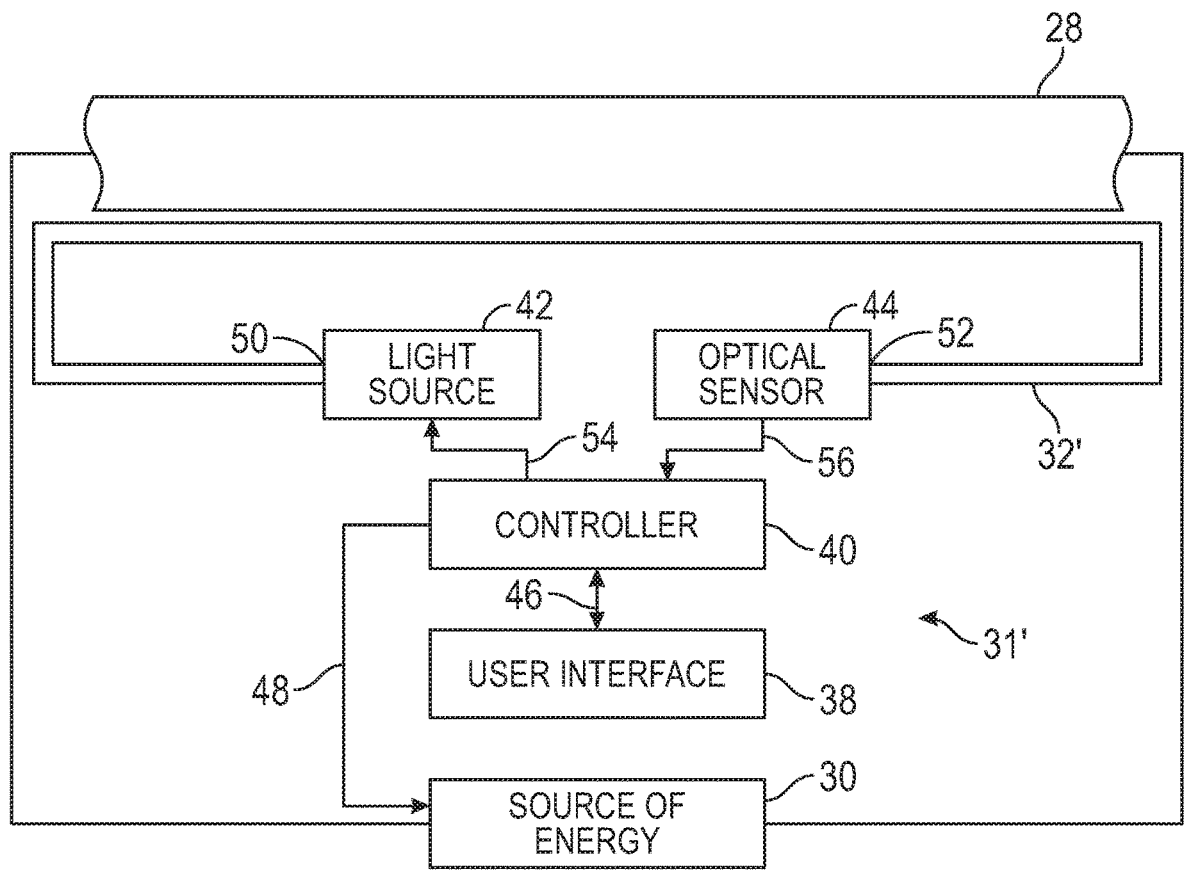
FIG. 4 is an enlarged cross-sectional view similar to FIG. 3 illustrating an alternative embodiment of an apparatus for operating and monitoring the heating mat.

FIG. 4 illustrates an alternative embodiment of an apparatus, indicated generally at 31', for operating and monitoring the heating mat 28. The structure and operation of the alternative apparatus 31' are, in large measure, identical to the apparatus 31 described above, and like reference numbers are used to identify similar components. In the alternative apparatus 31' shown in FIG. 4, however, an alternative optical fiber 32' is provided that extends in a generally parallel configuration in relation to the heating element 28, as opposed to the generally helical configuration shown in FIG. 3 and described above. However, as previously mentioned, the optical fiber 32' can be positioned in any configuration that permits it to monitor the temperature of the heating element 28.

Figure 5:
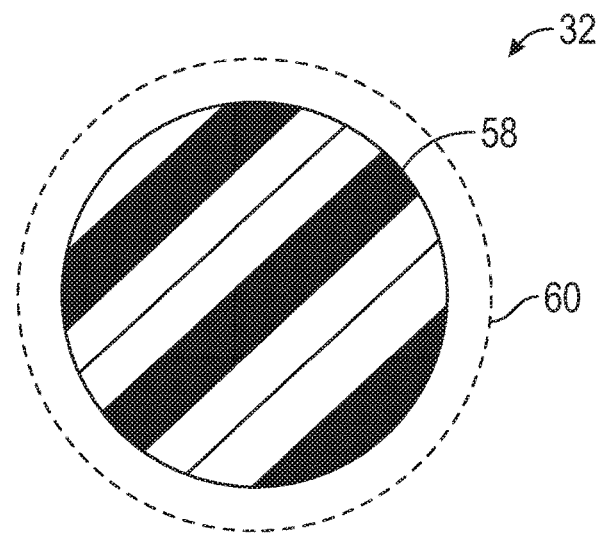
FIG. 5 is an enlarged cross-sectional view of an optical fiber illustrated FIGS. 3 and 4 illustrated in both an unheated condition (shown in solid lines) and a heated condition (shown in dotted lines).

FIG. 5 is an enlarged cross-sectional view of the optical fiber 32 illustrated in both an unheated condition 58 and in a heated condition 60. In the unheated condition 58 (shown in solid lines), the optical fiber 32 has a first diameter. In the heated condition 60 (shown in dotted lines), the optical fiber 32 has a second diameter that is larger than the first diameter. The optical fiber 32 is heated by heat radiating from the heating element 28, as described above. When the optical fiber 32 is heated, the change from the first diameter to the second diameter changes the light transmission properties of the optical fiber 28. As a result, one or more characteristics of light passing through the optical fiber 28 (such as brightness, color, refraction, etc.) and that is detected by the optical sensor 44 may change in accordance with the diameter of the optical fiber 32. The controller 40 can be programmed to correlate the change in the characteristic of the light detected by the optical sensor 44 with the diameter of the optical fiber 32 and, thus, the amount of the heat that is being generated by the heating element 28. Therefore, the controller 40 can determine the instantaneous temperature of the heat that is being generated by the heating element 28. The value of this instantaneous temperature can be used not only to determine if the amount of heat generated by the heating element 28 is in excess of the predetermined maximum amount (as described above), but additionally to anticipate whether the amount of heat generated by the heating element 28 is trending toward exceeding this predetermined maximum amount. Additionally, the controller can determine a rate of change in the temperature of the heat that is being generated by the heating element 28. However, the controller 40 may respond in any other desired manner.

Although this invention has been described in the context of the illustrated optical fiber 28, it will be appreciated that this invention may be practiced using other condition-responsive sensing structures. For example, the optical fiber 28, the light source 42, and the optical sensor 44 may be replaced by an electrical conductor that is connected between a source of electrical voltage or current and a detector of electrical voltage or current. Other condition-responsive sensing structures are contemplated in this invention.

The principle and mode of operation of this invention have been explained and illustrated in its preferred embodiments. However, it should be understood that this invention may be practiced otherwise than as specifically explained and illustrated without departing from its spirit or scope.

What is claimed is:
1. A seat comprising:
a seat portion including a heating element;
a sensing structure that is adapted to be disposed adjacent to a heating element and that is responsive to a temperature of the heating element for varying an amount of light passing through the sensing structure; and
a controller that is responsive to the amount of light passing through the sensing structure for determining when the temperature of the heating element exceeds a predetermined value.

2. The seat defined in claim 1 wherein the sensing structure has a first end and a second end, and wherein the controller is responsive to the amount of light transmitted through the sensing structure from the first end to second end.

3. The seat defined in claim 1 wherein the sensing structure includes an optical fiber.

4. The seat defined in claim 3 wherein the sensing structure further includes a light source connected to the first end of the optical fiber and an optical sensor connected to the second end of the optical fiber.

5. The seat defined in claim 4 wherein the optical sensor generates a signal that is representative of an amount of light received at the second end of the optical fiber, and wherein the controller is responsive to the signal generated by the optical sensor for determining when the temperature of the heating element exceeds the predetermined value.

6. The seat defined in claim 1 wherein the controller is responsive to a change in the amount of light transmitted through the sensing structure for determining when the temperature of the heating element exceeds the predetermined value.

7. The seat defined in claim 6 wherein the controller is responsive to a discontinuance of the amount of light transmitted through the sensing structure for determining when the temperature of the heating element exceeds the predetermined value.

8. The seat defined in claim 6 wherein the controller is responsive to a rate of change of the amount of light transmitted through the sensing structure for determining when the temperature of the heating element exceeds the predetermined value.

9. The seat defined in claim 1 wherein the sensing structure is wrapped helically about the heating element.

10. The seat defined in claim 1 wherein the sensing structure extends parallel to the heating element.

\* \* \* \* \*